United States Patent [19]

Aycock et al.

[11] Patent Number: 5,069,818
[45] Date of Patent: * Dec. 3, 1991

[54] FUNCTIONALIZED POLYPHENYLENE ETHERS AND BLENDS WITH POLYAMIDES

[75] Inventors: David F. Aycock, Glenmont; Sai-Pei Ting, Delmar, both of N.Y.

[73] Assignee: General Electric Company, Selkirk, N.Y.

[*] Notice: The portion of the term of this patent subsequent to Dec. 15, 2004 has been disclaimed.

[21] Appl. No.: 322,788

[22] Filed: Mar. 13, 1989

Related U.S. Application Data

[62] Division of Ser. No. 780,151, Sep. 26, 1985, Pat. No. 4,824,915.

[51] Int. Cl.$^5$ .............................................. C08L 71/12
[52] U.S. Cl. .................................. 525/397; 525/390; 549/245; 549/253; 560/86
[58] Field of Search ................. 780/151; 525/397, 390

[56] References Cited

U.S. PATENT DOCUMENTS

| | | |
|---|---|---|
| 3,261,846 | 7/1966 | Meyer . |
| 3,379,792 | 4/1968 | Finholt . |
| 3,689,464 | 9/1972 | Holub et al. . |
| 3,753,946 | 8/1973 | Holub et al. . |
| 3,770,699 | 11/1973 | White . |
| 3,833,618 | 9/1974 | Piasek et al. . |
| 3,895,064 | 7/1975 | Brode et al. . |
| 3,897,497 | 7/1975 | Brode et al. . |
| 3,988,374 | 10/1976 | Brode et al. . |
| 4,043,143 | 9/1977 | Hay et al. . |
| 4,058,504 | 11/1977 | Yonemitsu et al. . |
| 4,165,422 | 8/1979 | White . |
| 4,315,084 | 2/1982 | Cooper et al. . |
| 4,315,086 | 2/1982 | Ueno et al. . |
| 4,333,421 | 7/1982 | Maruyama et al. . |
| 4,421,392 | 12/1983 | Kasahara et al. . |
| 4,483,953 | 11/1984 | Axelrod . |
| 4,532,306 | 7/1985 | Sugio et al. . |
| 4,600,741 | 7/1986 | Aycock et al. . |
| 4,642,358 | 2/1987 | Aycock et al. . |
| 4,824,915 | 4/1989 | Aycock et al. ............. 525/397 |

*Primary Examiner*—Jacob Ziegler
*Attorney, Agent, or Firm*—Hedman, Gibson, Costigan & Hoare

[57] ABSTRACT

Functionalized polyphenylene ether compositions are provided which are particularly useful for effecting compatibility for a blend of polyphenylene ether resin and a polyamide resin. The functionalized-polyphenylene ether is the reaction product of a polyphenylene ether polymer and a compound having the general formula (i)—Z—(ii), wherein group (i) is a polyphenylene ether-philic moiety such as acyl chloride, group (ii) is a polyamide-philic moiety such as dicarboxylic acid anhydride, and Z is a divalent hydrocarbon radical providing a covalent linkage between groups (i) and (ii). An example of the compound having general formula (i)—Z—(ii) is trimellitic anhydride acid chloride.

4 Claims, No Drawings

FUNCTIONALIZED POLYPHENYLENE ETHERS AND BLENDS WITH POLYAMIDES This is a divisional of application Ser. No. 780,151 filed Sept. 26, 1985 now Pat. No. 4,824,915.

FIELD OF THE INVENTION

The present invention relates to a novel class of functionalized polyphenylene ether compounds which are a reaction product of a polyphenylene ether polymer and another compound which contains in its molecule both (i) at least one "acyl" functional group and (ii) at least one group capable of reacting or associating with a polyamide resin. A further discovery concerns the utilization of this functionalized-polyphenylene ether to provide compatible thermoplastic blends with polyamide resins. The functionalized-polyphenylene ether may be combined with the polyamide resin to provide the thermoplastic blend. Additionally, the functionalized polyphenylene ether can be used to compatibilize a thermoplastic blend of polyamide and conventional polyphenylene ether.

The compatible polyphenylene ether-polyamide compositions of the present invention exhibit improved chemical resistance, processability, elongation properties and impact strength.

BACKGROUND OF THE INVENTION

The polyphenylene ether resins are characterized by a unique combination of chemical, physical and electrical properties over a temperature range of more than 650° F., extending from a brittle point of about −275° F. to a heat distortion temperature of about 375° F. This combination of properties renders the polyphenylene ethers suitable for a broad range of applications. However, in spite of the aforementioned beneficial properties, the usefulness of the polyphenylene ether resins is limited in some applications as a consequence of processability, impact resistance and chemical resistance.

Finholt (U.S. Pat. No. 3,379,792) discloses polymer blends wherein the processability of polyphenylene ether resins may be improved by blending with from 0.1 to 25% by weight of a polyamide. However, the advantages of the Finholt invention are limited by the fact that when the concentration of the polyamide exceeds 20% by weight, appreciable losses in other physical properties result. Specifically, there is no, or at best poor, compatibility between the polyphenylene ether and the polyamide such that phase separation of the resins occurs on molding or the molded article is inferior in mechanical properties.

Ueno et al. (U.S. Pat. No. 4,315,086) discloses polyphenylene ether blends having improved chemical resistance without a loss of other mechanical properties by blending therewith a polyamide and a specific compound selected from the group consisting essentially of A) liquid diene polymers, B) epoxy compounds and C) compounds having in the molecule both of i) an ethylenic carbon-carbon double bond or carbon-carbon triple bond and ii) a carboxylic acid, acid anhydride, acid amide, imide, carboxylic acid ester, amino or hydroxy group.

Finally, Kasahara et al (EP46040) discloses the use of a copolymer comprising units of a vinyl aromatic compound and either an alpha, beta-unsaturated dicarboxylic acid anhydride or an imide compound thereof as a modifier to an impact resistant polyphenylene ether-polyamide blend for improved heat resistance and oil resistance.

The present applicants have disclosed novel polyphenylene ether-polyamide blends having improved impact strength, elongation, chemical resistance, processability and/or heat resistance as well as reduced water absorption as compared to unmodified polyphenylene ether-polyamide compositions.

Specifically, applicants have discovered novel resin compositions having the aforementioned properties comprising a blend of a polyamide with or without a conventional polyphenylene ether and a property improving amount of the effective functionalized-polyphenylene ether compatibilizer described in detail below.

The functionalized-polyphenylene ether is a polyphenylene ether polymer which has been reacted with another compound which contains in its molecule both of two groups (i) and (ii) which are described in detail below. The molecule containing both groups (i) and (ii) is nominally an "acyl-functional" moiety within the broad definition of such materials below. The group (ii) portion of the molecule is considered to be a polyamide-philic moeity.

Accordingly, the functionalized-polyphenylene ether compatibilizing compound is provided by the reaction of a polyphenylene ether polymer and a compound containing the requisite, aforementioned groups (i) and (ii). The resultant product is the reaction residue of the polyphenylene ether polymer and the group (i), (ii) molecule.

An example of a molecule containing the requisite group (i) and group (ii) moieties is trimellitic anhydride acid chloride.

It has been discovered, for example, that polyphenylene ether polymer may be reacted with trimellitic anhydride acid chloride (TAAC) and the reaction product (PPE-TAAC) functions very effectively as a compatibilizer for polyphenylene ether-polyamide blends. With proper impact modification, the resultant blends exhibit very attractive physical properties such as high heat distortion temperature (HDT), good impact strength and mechanical properties, low shrinkage, and outstanding chemical resistance and hydrolytic stability for many end-use applications.

It also has been discovered that PPE-TAAC is superior to maleic anhydride as a compatibilizer for polyphenylene ether/polyamide (PPE/PA) blends in many respects.

For example, PPE-TAAC compatibilizer offers better color stability. Significant discoloration after extrusion was observed for PPE/Nylon (6/6) blends which were compatibilized with maleic anhydride in the manner taught by UENO, et al. Such discoloration was not evident in PPE/PPE-TAAC/Nylon 6/6 blends of the present invention.

The functionalized-polyphenylene ether compatibilizer also offers improved dimensional stability. Higher mold shrinkage was observed in prior art PPE/Nylon (6/6)/maleic anhydride blends in comparison with PPE/PPE-TAAC/Nylon (6/6) blends of the present invention having comparable physical properties.

The functionalized-polyphenylene ether compatibilizer also offers higher matrix ductility. Impact modified PPE/Nylon (6/6)/maleic anhydride blends from the prior art exhibited significantly lower Izod impact strength and less ductile failure behavior in a falling dart test than corresponding PPE/PPE-TAAC/Nylon (6/6)

blends of the present invention. The mode of ductile failure can be an extremely important consideration when choosing a thermoplastic for various end-use applications.

The functionalized-polyphenylene ether compatibilizer provides better phase dispersion and interfacial adhesion. PPE/Nylon (6/6)/maleic anhydride blends were judged from morphology and solubility test results to have much inferior phase dispersion and interfacial adhesion compared to PPE/PPE-TAAC/Nylon (6/6) blends of the present invention.

SUMMARY OF THE INVENTION

The novel functionalized-polyphenylene ether, which may be incorporated in novel, compatible blends of polyphenylene ether and polyamide, is the reaction product of
(a) a polyphenylene ether polymer, and
(b) a compound of the general formula (i)—z—(ii)

which is a compound that contains in its molecule both group (i) which is at least one group having the formula

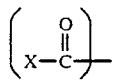

where X is F, Cl, Br, I, OH, OR, or

where R is H or an alkyl or aryl radical and group (ii) which is at least one carboxylic acid, acid anhydride, acid amide, imido, carboxylic acid ester, amino or hydroxyl group; wherein groups (i) and (ii) are covalently bonded through linkage Z, where Z is a divalent hydrocarbon radical. Z may be either a divalent alkyl or aryl radical linking groups (i) and (ii), and would be comprised of at least one and typically one to six carbon atoms.

In the compound having the formula (i)—z—(ii), groups (i) and (ii) will not both be carboxylic acid groups at the same time. Thus, although group (i) may be a carboxylic acid group (—COOH), in such case group (ii) would not contain one or more carboxylic acid groups. Rather, in this instance, group (ii) might preferably be an anhydride group. The converse is also true, if group (ii) of the compound contains one or more carboxylic acid groups, then group (i) would not be —COOH. In this case, group (i) would preferably be an acyl chloride group or similar moiety.

The invention also encompasses combining this functionalized polyphenylene ether with a polyamide. Such combination may be a physical admixture by conventional means, a chemical reaction product of the various components, and blends and reaction products of various combinations of the requisite materials which may be later combined into a compatible product. The expressions "polyphenylene ether-polyamide blend" and "PPE-PA" are intended to encompass each of these possibilities.

The compatibilizing compound provided by the present invention can provide compatible blends of polyphenylene ether and polyamide in any proportion. Typically, however, the polyphenylene ether will be present in an amount of 5 to 95 weight percent and the polyamide will be present at 95 to 5 weight percent, based upon the weights of both resins together.

A preferred composition might comprise 25 to 75 weight percent polyphenylene ether and 75 to 25 weight percent polyamide.

The compatibilizing compound will be present in an amount at least sufficient to effect compatibility of the resinous components and is intended to encompass adequate dispersion of the two resins in a manner which provides useful thermoplastic compositions, as well as useful non-delaminatning products.

Typically, at least about 1 part by weight of the compatibilizing component will be necessary per 100 parts of resinous components. Preferred formulations may contain, approximately 10 to 30 parts by weight of compatibilizing component per 100 parts resin.

Thus a typical embodiment comprises an admixture of polyphenylene ether, polyamide and a functionalized polyphenylene ether compatibilizing agent such as polyphenylene ether reacted with trimellitic anhydride acid chloride (PPE-TAAC).

Alternatively, the compatibilizing agent can first be precompounded or pre-reacted with either of the two resinous materials.

Furthermore, the functionalized polyphenylene ether such as polyphenylene ether-trimellitic anhydride acid chloride reaction product (PPE-TAAC) can replace all or some of the conventional polyphenylene ether in a polyphenylene ether/polyamide product.

Preferred polyphenylene ethers are homopolymers or copolymers having units with the repeating structural formula:

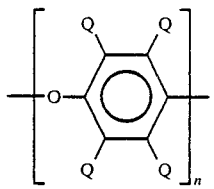

wherein the oxygen ether atom of one unit is connected to the benzene nucleus of the next joining unit, and n is a positive integer of at least 50, and each Q is, independently, a monovalent substituent selected from a group consisting of hydrogen, halogen, hydrocarbon and hydrocarbonoxy groups free of a tertiary alpha-carbon atom, and halohydrocarbon and halohydrocarbonoxy groups free of a tertiary alpha-carbon and having at least 2 carbon atoms between the halogen atom and the phenyl nucleus.

A particularly preferred polyphenylene ether is poly(2,6-dimethyl-1,4-phenylene) ether.

Compatible compositions are intended to include any of the well known polyamides or nylons such as polyamide 6; polyamide 6/6; polyamide 4/6; polyamide 12; and polyamide 6/10, combinations of these where appropriate, as well as high impact, super toughened polyamides. Polyamide 6/6 or polyamide 6 is preferred.

Optionally, the compositions of the present invention may further comprise polymeric impact modifiers, inorganic reinforcing additives or other polymers including alkenyl aromatic polymers such as the styrenic polymers.

Improved polyphenylene ether-polyamide compositions may be made by melt blending the above-mentioned ingredients. Alternatively, to achieve optimum property improvements it may be preferred to precompound the property improving compatibilizing agent, together with either one of the polymer resins.

Although the exact physical configuration of the compositions of the present invention is not known, it is generally believed that the compositions comprise a dispersion of one polymer in the other. A likely configuration is wherein the polyphenylene ether is dispersed in a polyamide matrix, however, the inverse may also be possible, particularly where the polyamide is present in only a minor amount. It will be recognized that good dispersion of one polymer in the other will ordinarily afford a useful, compatible thermoplastic product. The functionalized-polyphenylene ether compatibilizing compound of the present invention has been found to achieve such dispersion. Applicants also contemplate that there may be present in the products produced hereby some graft polyphenylene ether-polyamide products. Thus, all such dispersions as well as graft, partially grafted and non-grafted products are within the full intended scope of the invention.

DETAILED DESCRIPTION OF THE INVENTION

The polyphenylene ethers suitable for use in the practice of the present invention are well known in the art and may be prepared by any of a number of catalytic and non-catalytic processes from corresponding phenols or reactive derivatives thereof. Examples of polyphenylene ethers and methods for their production are disclosed in U.S. Pat. Nos. 3,306,874; 3,306,875; 3,257,357; 3,257,358; 3,337,501 and 3,787,361, all incorporated herein by reference. For brevity, the term "polyphenylene ether" as used throughout this specification and the appended claims will include not only unsubstituted polyphenylene ether (made from phenol) but also polyphenylene ethers with various substituents. The term also includes polyphenylene ether copolymers; as well as graft and block copolymers of alkenyl aromatic compounds, especially vinyl aromatic compounds, as disclosed below, and a polyphenylene ether.

Suitable phenol compounds for the preparation of the polyphenylene ethers may be represented by the general formula:

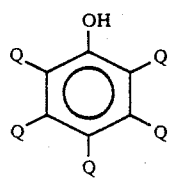

wherein each Q is a monovalent substituent individually selected from the group consisting of hydrogen, halogen, aliphatic and aromatic hydrocarbon and hydrocarbonoxy radicals free of a tertiary alpha-carbon atom and halohydrocarbon and halohydrocarbonoxy radicals free of a tertiary alpha-carbon atom and having at least two carbon atoms between the halogen atom and the phenyl nucleus, and wherein at least one Q is hydrogen.

As specific examples of the phenol compound represented by the above formula, there may be given phenol; o-, m- and p- cresols; 2,6-, 2,5-, 2,4- and 3,5-dimethylphenols; 2-methyl-6-phenyl-phenol; 2,6-diphenyl-phenol; 2,6-diethylphenol; 2-methy-6-ethyl-phenol; and 2,3,5-, 2,3,6- and 2,4,6-trimethylphenols. Two or more phenol compounds may be used in combination should copolymers be desired. Additionally, copolyphenylene ethers may also be prepared from a phenol compound of the above general formula with a phenol compound not represented by the above general formula including, for example, a dihydric phenol such as bisphenol-A, tetrabromobisphenol-A, resorcinol or hydroquinone.

Illustrative of suitable polyphenylene ethers there may be given for example, poly(2,6 dimethyl-1,4-phenylene)ether; poly(2-methyl-1,4-phenylene) ether, poly(3-methyl-1,4-phenylene)ether; poly(2,6-diethyl-1,4-phenylene)ether; poly(2-methyl-6-allyl-1,4-phenylene)ether; poly(2,6-dichloromethyl-1,4-phenylene)ether; poly2,3,6-trimethyl-1,4-phenylene)ether; poly(2,3,5,6-tetramethylphenylene)ether;poly(2,6-dichloro-1,4-phenylene)ether; poly(2,6-diphenyl-1,4-phenylene)ether; poly(2,5-dimethyl-1,4-phenylene)ether and the like. Further, as mentioned above, copolymers of the phenol compounds may also be used.

Preferred polyphenylene ethers will have the formula:

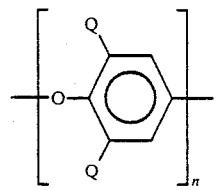

where Q is as defined above and n is at least 50, preferably from about 50 to about 200. Examples of polyphenylene ethers corresponding to the above formula can be found in the above referenced patents and include, among others: poly(2,6-dilauryl-1,4-phenylene)ether; poly(2,6-diphenyl-1,4-phenylene)-ether; poly(2,6-dimethyoxy-1,4-phenylene)ether; poly(2,6-diethyoxy-1,4-phenylene)ether; poly(2-methoxy-6-ethyoxyphenylene)ether; poly(2-ethyl-6-tearyloxy-1,4-phenylene)ether; poly(2,6-dichloro-1,4-phenylene)ether; poly(2-methyl-6-phenyl-1,4-phenylene)ether poly(2,6-dibenzyl-1,4-phenylene) ether; poly(2-ethoxy-1,4-phenylene)ether; poly(2-chloro-1,4-phenylene)ether; poly(2,6-dibromo-1,4-phenylene)-ether; and the like.

For the purpose of the present invention, an especially preferred family of polyphenylene ethers include those having a $C_1$ to $C_4$ alkyl substitution in the two positions ortho to the oxygen ether atom. Illustrative members of this class are: poly(2,6-dimethyl-1,4-phenylene)ether: poly(2,6-diethyl-1,4-phenylene)ether; poly(2-methyl-6-ethyl-1,4-phenylene)ether; poly(2,6-dipropyl-1,4-phenylene)ether; poly(2-ethyl-6-propyl-1,4-phenylene)ether; and the like; most preferably poly(2,6-dimethyl-1,4-phenylene)ether.

One method for the production of the above polyphenylene ethers is by the oxidation of a phenol compound by oxygen or an oxygen-containing gas in the presence of a catalyst for oxidative coupling. There is no particular limitation as to the choice of catalysts and any catalysts for oxidation polymerization can be employed. As typical examples of the catalyst, there may be given a catalyst comprising a cuprous salt and a tertiary amine and/or secondary amine, such as cuprous chloride-trimethylamine and dibutylamine, cuprous acetate-triethylamine or cuprous chloride-pyridine; a catalyst comprising a cupric salt, a tertiary amine, and an alkali metal hydroxide, such a cupric chloride-pyridine-potassium hydroxide; a catalyst comprising a manganese salt and a primary amine, such as manganese choride-ethanolamine or manganese acetate-ethylenediamine; a catalyst comprising a manganese salt and an alcholate or phenolate, such as manganese chloride-sodium methlate or manganese chloride-sodium phenolate; and a catalyst comprising a cobalt salt and a tertiary amine.

Polyamides suitable for the preparation of compatible compositions may be obtained by polymerizing a monoamino-monocarboxylic acid or a lactam thereof having at least 2 carbon atoms between the amino and carboxylic acid group; or by polymerizing substantially equimolar proportions of a diamine which contains at least 2 carbon atoms between the amino groups and dicarboxylic acid; or by polymerizing a monoaminocarboxylic acid or a lactam thereof as defined above together with substantially equimolecular proportions of a diamine and a dicarboxylic acid. The dicarboxylic acid may be used in the form of a functional derivative thereof, for example an ester or acid chloride.

The term "substantially equimolecular" proportions (of the diamine and of the dicarboxylic acid) is intended to encompass both strict equimolecular proportions and slight departures therefrom which are involved in conventional techniques for stabilizing the viscosity of the resultant polyamides.

Examples of the aforementioned monoamino-monocarboxylic acids or lactams thereof which are useful in preparing the polyamides include those compounds containing from 2 to 16 carbon atoms between the amino and carboxylic acid groups, said carbon atoms forming a ring with the —CO—NH— group in the case of a lactam. As particular examples of aminocarboxylic acids and lactams there may be mentioned gamma-aminocaproic acid, butyrolactam, pivalolactam, caprolactam, capryllactam, enantholactam, undecanolactam, dodecanolactam and 3- and 4-aminobenzoic acids.

Examples of diamines suitable for preparing the polyamides include diamines of the general formula

wherein n is an integer of from 2 to 16, such as trimethylenediamine, tetramethylenediamine, pentamethylenediamine, octamethylenediamine and especially hexamethylenediamine.

The dicarboxylic acids may be aromatic, for example isophthalic and terephthalic acids. Preferred dicarboxylic acids are of the formula

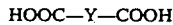

wherein Y represents a divalent aliphatic group containing at least 2 carbon atoms, and examples of such acids are sebacic acid, octadecanedoic acid, suberic acid, glutaric acid, pimelic acid and adipic acid.

Typical examples of the polyamides or nylons, as these are often called, include for example polyamides 6, 6/6, 11, 12, 6/3, 6/4, 6/10 and 6/12 as well as polyamides resulting from terephthalic acid and trimethyl hexamethylene diamide, polyamides resulting from solipic acid and meta xylylenediamines, polyamides resulting from adipic acid, azelaic acid and 2,2-bis-(p-aminocyclohexyl) propane and polyamides resulting from terephthalic acid and 4,4'-diamino-dicyclohexylmethane. Preferred polyamides are the polyamides 6, 6/6, 4/6, 11 and 12, most preferably polyamide 6/6 or polyamide 6.

The blending ratio of polyphenylene ether to polyamide is 5 to 95% by weight preferably 25 to 75% by weight of the former to 95 to 5% by weight, preferably 75 to 25% by weight of the latter. When the polyamide is less than 5 weight percent, its effect to improve solvent resistance is small, and when it exceeds 95 weight percent, thermal properties such as heat distortion temperature tend to become poor.

Compatibility between the polyphenylene ether resin and the polyamide resin is believed to be achieved when the functionalized-polyphenylene ether compatibilizing agent is chemically or physically associated with the polyphenylene and/or polyamide resins.

For example, a linear polyphenylene ether having an end group of formula I:

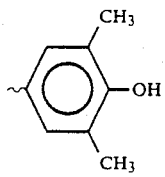

may be reacted in the presence of heat and solvent with an acyl compound having the general formula (i) —Z—(ii) such as trimellitic anhydride acid chloride of formula II:

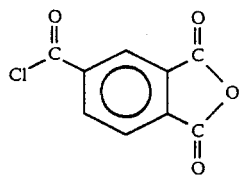

to provide a PPE-TAAC functionalized-polyphenylene ether compatibilizing agent of formula III, which may be appropriately purified as by precipitation in methanol or acetone, and may thereafter desirably be filtered and dried:

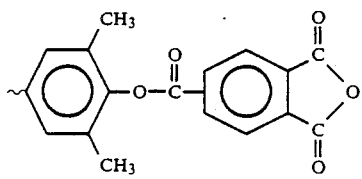

It is evident in this example that the polyphenylene ether polymer has reacted with the group (i) portion of the trimellitic anhydride acid chloride

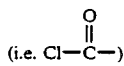

and the residue thereof is

The anhydride portion of this compatibilization agent is polyamide-philic and is believed to be primarily responsible for the chemical or physical association of the agent with the polyamide resin.

Of course it is contemplated that the compatibilization agent can be generalized to encompass a number of other effective agents which would act similarly to the preferred PPE-TAAC agents discussed above.

The compounds having formula (i)—Z—(ii) are in effect compatibilization precursors inasmuch as they are reacted with a polyphenylene ether polymer to provide a functionalized-polyphenylene ether. This functionalized-polyphenylene ether effects compatibility with polyamides or with polyphenylene ether/polyamide compositions.

For example, the group (i) portion of the compatibilizing molecule associated or bonded to the PPE resin chain has been generalized as an acyl-functional group depicted by formula IV:

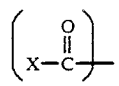

IV where x is F, CL, Br, I, OH, OR or

etc. and where R is H or an aliphatic or aromatic radical having less than about 10 carbon atoms. The polyphenylene ether-philic moiety of formula IV is covalently bonded to a polyamide-philic group which is primarily responsible for associating or bonding with the polyamide portion of the thermoplastic composition. In a preferred embodiment such as TAAC discussed above, this group is an anhydride group.

Examples of suitable materials of general formula (i)—Z—(ii) and falling within the scope of the invention include but are not limited to the following compatibilizer precursors:
chloroethyanoylsuccinic anhydride

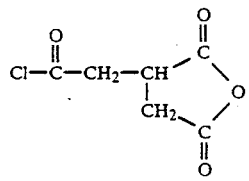

trimellitic anhydride acid chloride

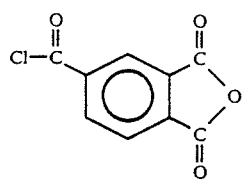

chloroformylsuccinic anhydride

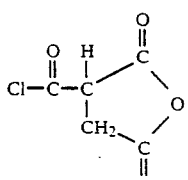

1-acetoxyacetyl-3,4-dibenzoic acid anhydride

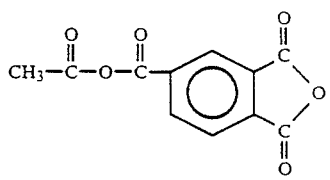

Of course, compatibilizer precursors effective in this invention are not limited to the preferred anhydrides mentioned above. It is well known that polyamides will react or associate with a very large number of molecules containing groups chosen from among carboxylic acid (including mono- and poly- acids), acid anhydride, acid amide, imido carboxylic acid ester, amino or hydroxyl groups. In this regard, reference is made to the UENO patent discussed above.

Thus it is contemplated that the acid chloride of terephthalic acid can also be utilized to provide the functionalized polyphenylene ether of the present invention.

The amount of the compound of formula (i)—Z—(ii) to be used to functionalize the polyphenylene ether polymer is that amount which manifests property improvement, especially improved compatibility as well as improved processability, impact strength and/or elongation, in the polyphenylene ether-polyamide compositions. In general, the amount of compatibilizer precursor of formula (i)—Z—(ii) used to react with polyphenylene ether will be up to about 6%, preferably from about 0.05 to about 4% by weight based on the polyphenylene ether. The specific amount of the compatibilizer to be used to achieve optimum results for a given composition is dependent, in part, on the specific compatibilizer precursor, the specific polyphenylene ether to be reacted, the specific polyphenylene ether and polyamide to be compatibilized and the weight ratio of said polymers and the processing conditions. A variety of suitable combinations can be achieved without undue experimentation.

In addition to the improved processability, impact strength and elongation, many of the compositions prepared in accordance with the present invention manifest improvements in other physical properties and characteristics including for example, reduced water absorption.

The above-mentioned property improving compatibilizer compound may be used alone or in combination with a primary or secondary amine. The presence of the amine may enhance the improvement of certain physical properties when used in combination with various compatibilizers. Suitable amines include those primary and secondary amines having from 1 to about 20, preferably from 1 to about 10 carbon atoms. Examples of said suitable amines are, methyl ethylamine, diethylamine, butylamine, dibutylamine, analine, n-octadecylamine and the like. The amount of the primary or secondary amine to be used is generally up to about 3% by weight, preferably up to about 1% by weight.

In the practice of the present invention, it may be further desirable to add rubbery high-molecular weight polymers to further improve the physical properties of a polyphenylene ether polyamide blend such as impact strength, and processability. The rubbery high-molecular weight materials include natural and synthetic polymeric materials showing elasticity at room temperature. More specifically, the rubbery high molecular weight materials include natural rubber, thermoplastic elastomers as well as homopolymers and copolymers, including random, block and graft copolymers derived from various suitable monomers known to those skilled in the art including butadiene, possibly in combination with vinyl aromatic compounds, especially styrene. As specific examples of the rubbery high-molecular weight materials, there may be given, for example, natural rubber, butadiene polymers, styrene copolymers, butadiene/styrene copolymers, isoprene polymers, chlorobutadiene polymers, butadiene/acrylonitrile copolymers, isobutylene polymers, isobutylene/butadiene copolymers, isobutylene/isoprene copolymers, acrylic ester polymers, ethylene propylene copolymers, ethylene/propylene/diene copolymers, thiokol rubber, polysulfide rubber, polyurethane rubber, polyether rubber (e.g. polypropylene oxide) and epichlorohydric rubber.

A preferred class of rubber materials are copolymers, including random, block and graft copolymers of vinyl aromatic compounds an conjugated dienes. Exemplary of these materials there may be given hydrogenated or non-hydrogenated block copolymers of the A-B-A and A-B type wherein A is polystyrene and B is an elastomeric diene, e.g. polybutadiene, radial teleblock copolymer of styrene and a conjugated diene, acrylic resin modified styrene-butadiene resins and the like; and graft copolymers obtained by graft-copolymerization of a monomer or monomer mix containing a styrenic compound as the main component to a rubber-like polymer. The rubber-like polymer used in the graft copolymer as already described herein includes polybutadiene, styrene-butadiene copolymer, acrylonitrile-butadiene copolymer, ethylene-propylene copolymer, polyacrylate and the like. The styrenic compounds include styrene, methylstyrene, dimethylstyrene, isopropylstyrene, alpha-methylstyrene, ethylvinyltoluene and the like. The monomer which may be used together with the styrenic compound includes, for example, acrylate, methyacrylate, acrylonitrile, methyacrylonitrile, methyacrylic acid, acrylic acid and the like.

Finally, additional thermoplastic elastomers suitable for use as the rubbery material include thermoplastic polyester elastomers, thermoplastic polyether-ester elastomers, ethylenic ionomer resins and the like.

The amount of the rubbery polymer used will be up to about 100 parts by weight, preferably from about 5 to about 50 parts by weight based on 100 parts by weight of a mixture of polyphenylene ether and polyamide. However, when the amount is less than 2 parts by weight, the effect of the rubbery polymer to improve impact resistance is poor. When the amount is more than 100 parts by weight, the impact resistance is much improved, however, some loss of other physical properties may result. In the interest of balancing impact resistance and other physical properties, it is preferred to use less than 100 parts by weight of the rubber polymer.

The polyphenylene ether-polyamide compositions may also comprise similar amounts, as referred to above, of alkenyl aromatic compounds. These alkenyl aromatic compounds may or may not be partially or wholly copolymerized with and/or grafted to the polyphenylene ether. Especially, suitable are the styrene resins described in for example U.S. Pat. No. 3,383,435, incorporated herein by reference. In general, the styrene resins will have at least 25% by weight of the polymer units derived from a vinyl aromatic compound of the formula:

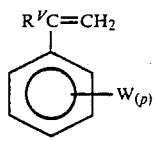

wherein $R^V$ is hydrogen, (lower) alkyl or halogen, W is vinyl, halogen or (lower) alkyl, and p is 0 or an integer of from 1 to the number of replaceable hydrogen atoms on the benzene nucleus. Herein, the term "(lower) alkyl" is intended to mean alkyl of from 1 to 6 carbon atoms.

The term "styrene resins" as used broadly throughout this disclosure and the appended claims includes, by way of example, homopolymers such as polystyrene, polychlorostyrene and polybromostyrene, as well as polystyrenes, including high impact polystyrenes, which have been modified by a natural or synthetic rubber, e.g. polybutadiene, polyisoprene, butyl rubber, ethylene-propylene diene copolymers-(EPDM rubber), ethylene-propylene copolymers, natural rubbers, polysulfide rubbers, polyurethane rubbers, styrene-butadiene rubbers (SBR), and the like: styrene containing copolymers such as styrene-acrylonitrile copolymers (SAN), styrene-butadiene copolymers, styrene-bromostyrene copolymers especially styrene-dibromostyrene copolymers, styrene-acrylonitrile-butadiene terpolymers (ABS), poly-alpha-methylstyrene, copolymers of ethylvinyl benzene and divinylbenzene and the like.

Finally, in addition to the foregoing, the resin compositions of the present invention may further comprise other reinforcing additives, including glass fibers, carbon fibers, mineral fillers and the like as well as various flame retardants, colorants, stabilizers and the like known to those skilled in the art.

The method for producing the resin compositions of the present invention is not particularly limited, and the conventional methods are satisfactorily employed. Generally, however, melt blending methods are desirable. The time and temperature required for melt-blending are not particularly limited, and they can properly be determined according to the composition of the material. The temperature varies somewhat with the blending ratio of the polyphenylene ether to polyamide, but it is generally within a range of 270° to 350° C. A prolonged time and/or a high shear rate is desirable for mixing, but the deterioration of the resin composition advances. Consequently, the time needs to be determined taking into account these points.

Any of the melt-blending methods may be used, if it can handle a molten viscous mass. The method may be applied in either a batchwise form or a continuous form. Specifically, extruders, Banbury mixers, rollers, kneaders, and the like may be exemplified.

All ingredients may directly be added to the processing system or one polymer. With respect to the other ingredients of the composition, all ingredients may be added directly to the processing system or certain additives may be precompounded with each other or either polymer prior to blending with the other polymer. For example, the polyphenylene ether may be precompounded with the rubber polymer and/or the compatibilizer and subsequently compounded with the polyamide.

All the aforementioned patents or applications are hereby incorporated by reference. The following examples are given to illustrate the invention without limitation.

Synthesis of Poly-(2,6-Dimethyl-1,4-Phenylene Ether

To a stainless steel reactor equipped with an agitator, oxygen sparge pipe, and heat exchanger was added in order: 332 parts be weight toluene, 10 parts 2,6-xylenol, 4.3 parts dimethyl-n-butylamine, 1.0 parts di-n-butylamine, 0.3 parts di-t-butylethylenediamine, and a solution of 0.08 parts cuprous oxide dissolved in 0.8 parts of 50 weight percent aqueous HBr. Oxygen is sparged into the agitated solution while 90 parts of 2,6-xylenol is pumped into the reactor over a period of 40 minutes. The reactor temperature is kept at about 35° C. during the portion of the reaction where the molecular weight is increasing. After about 120 minutes the oxygen flow is stopped. The temperature of the polymer solution is maintained at between 50° to 70° C. during which time the by-product 2,6-dimethyldiphenoquinone reacts with an˙ is incorporated into the polymer. Nitrilotriacetic acid is added to the polymer solution to complex with the copper catalyst and is removed with a liquid-liquid centrifuge. The copper free polymer solution at this point is referred to as "body feed" and contains 18 to 22 weight percent polymer. The polymer solution is concentrated to about 30 weight percent solution by distilling off solvent prior to precipitating the polymer with methanol. The 30 percent polymer solution is called "pre con" solution. Dried, filtered polymer produced in this manner is in the form of polyphenylene ether powder. Such powder may be functionalized as described in the following example or may be utilized as the conventional polyphenylene ether in a polyamide-polyphenylene ether composition. The polyphenylene ether polymer produced by this process has an intrinsic viscosity of, approximately, 0.45 dl/g as measured in chloroform at 25° C.

EXAMPLE 1

Synthesis of Functionalized-Polyphenylene Ether

Various polyphenylene ether-trimellitic anhydride acid chloride reaction products were prepared. In one method, a 30% by weight solution of poly(2,6 dimethyl-1,4-phenylene) ether in toluene (obtained directly from the polymerization of 2,6-xylenol in toluene after removal of copper catalyst) was utilized ("PRE CON" PPE). In another method, an "isolated PPE" obtained by methanol precipitation and dissolved in 500 parts toluene was used. In either case, one hundred parts of PPE was reacted with between 1.7 to 2.3 parts of trimellitic anhydride acid chloride (TAAC), and between 4.1 to 5.8 parts of dimethyl-n-butylamine (DMBA) was utilized as an acid acceptor. The reactions were carried out at 95° C. for between 0.5 to 3.0 hours.

The TAAC was obtained from Aldrich Chemical at a purity of 99%, molecular weight 210.57 g/mole, and melting point of 66° to 68° C.

The reaction products were purified by precipitation in methanol and thereafter dried overnight in a vacuum oven at 60° to 80° C.

The formation of PPE-TAAC was verified by infrared analysis which indicated a reduction of a known PPE hydroxyl peak at 2650 to 2900 nm and the appearance of a carbonyl absorption peak appeared at 1730–1740 cm$^{-1}$.

Table 1 details conditions for reaction of PPE and TAAC.

TABLE 1

| WT % PPE SAMPLE DESCRIPTION | Conditions For Reaction of PPE With TAAC | | | |
|---|---|---|---|---|
| | WEIGHT % PPE in TOLUENE | g TAAC/ 100 g PPE | g DMBA/ 100 g PPE | TIME AT 95° C. hrs. |
| Methanol Ppt. PPE | 20 | 2.1 | 4.1 | 3 |
| Methanol Ppt. PPE | 20 | 2.3 | 4.1 | 1.5 |
| Pre Con PPE | 30 | 2.3 | 5.8 | 1.5 |
| Pre Con PPE | 30 · | 2.3 | 5.8 | 0.5 |
| Pre Con PPE | 30 | 1.7 | 5.8 | 0.5 |

EXAMPLES 2–3

Compatibilization of Polyphenylene Ether-Polyamide Blends

PPE-TAAC prepared as described above was evaluated as a compatibilizer for PPE-polyamide blends and its performance was compared with a known compatibilizing agent, maleic anhydride, in a variety of blends.

The maleic anhydride was obtained from Aldrich at 99% purity, molecular weight 98.06 g/mole, and melting point of 54°–56° C. The polyamide was a general purpose nylon (6/6), Zytel-101, obtained from DuPont. The PPE was poly(2,6 dimethyl-1,4-phenylene) ether resin manufactured by General Electric Company in the manner described above.

Samples were extruded using a 28 mm Werner-Pleiderer twin screw extruder at 65% torque and full RPM with a heat profile of 350°, 450°–500°, 550°, 550°, 550°, and 550° F.

Samples were molded on a 3 oz. Newbury injection molding machine at 550°/150° C., 15/40 sec cycle, 100 RPM and 100 PSI back pressure.

Specimens used for HDT, Izod impact, and tensile tests were ⅛ inch × ½ inch × 2½ inch minibars. Dynatup falling dart impact test specimens were ⅛ inch × 4 inch round discs.

Table 2 demonstrates improvements in compositions of the present invention in comparison with non-compatibilized blends or those compatibilized with maleic anhydride. Note that degree of chemical resistance can be judged by the retention of tensile yield strength for specimens in a testing environment of 185° F. for three days in Ford brake fluid.

TABLE 2

COMPATIBILIZED PPE/POLYAMIDE BLENDS

| SAMPLE | A* | B* | C* | 2 | 3 |
|---|---|---|---|---|---|
| PPE | 49 | 49 | 49 | 24.5 | — |
| PPE-TAAC | — | — | — | 24.5 | 49 |
| NYLON 6,6 | 41 | 41 | 41 | 41 | 41 |
| MALEIC ANHYDRIDE | — | .50 | 1.0 | — | — |
| KG-1651** | 10 | 10 | 10 | 10 | 10 |
| HDT ('F) @ 264 psi | 367 | 368 | 380 | 357 | 360 |
| IZOD (ft. lb/in) | .10 | 3.5 | 3.3 | 5.9 | 4.6 |
| DYNATUP (in. lb) | 2 | 363 | 334 | 387 | 312 |
| TENSILE YIELD (kpsi) | 7.3 | 8.6 | 8.5 | 9.0 | 9.1 |
| TENSILE STRENGTH (kpsi) | 7.1 | 7.9 | 8.0 | 8.3 | 8.0 |
| TENSILE ELONGATION % | 11 | 123 | 124 | 140 | 89 |
| SHRINK (in/in × $10^{-3}$) | 14.4 | 10.6 | 9.8 | 10.2 | 9.3 |
| T.Y. ORIGINAL (NO AGEING) | 7.3 | 8.6 | 8.5 | 9.0 | 9.1 |
| 0% STRAIN % ORIGINAL T.Y. | 96 | 101 | 100 | 99 | 100 |
| ½% STRAIN % ORIGINAL T.Y. | 90 | 101 | 102 | 98 | 101 |
| 1% STRAIN % ORIGINAL T.Y. | 79 | 99 | 99 | 99 | 99 |
| 2% STRAIN % ORIGINAL T.Y. | 44 | 57 | 87 | 97 | 80 |

*Comparative
**Kraton Rubber, Shell Chemical Co. (styrene-ethylene-butylene-styrene copolymer)

EXAMPLES 4–7

The compositions described in Table 3 demonstrate the significant improvements in physical properties exhibited by blends of the present invention. Especially notable are improvements in impact strength.

TABLE 3

Additional PPE/Polyamide Blends

| SAMPLE | 4 | 5 | D* | E* | 6 | 7 |
|---|---|---|---|---|---|---|
| PPO | 24.5 | 24.5 | 50 | 25 | 25 | 12.5 |
| PPO-TAAC (isolated) | 24.5 | — | — | — | — | — |
| PPO-TAAC (body feed) | — | 24.5 | — | — | 25 | 12.5 |
| NYLON 6,6 | 41 | 41 | 50 | 75 | 50 | 75 |
| KG-1651 | 10 | 10 | 10 | 10 | 10 | 10 |
| HDT ('F) @ 264 psi | 361 | 370 | 374 | 373 | 372 | 371 |
| IZOD (ft. lb/in) | 5.4 | 7.2 | 0.3 | 0.9 | 4.9 | 3.7 |
| DYNATUP (in. lb) | 366 | 341 | 13 | 141 | 420 | 427 |
| TENSILE YIELD (kpsi) | 8.9 | 9.1 | 8.3 | 8.7 | 9.2 | 9.1 |
| TENSILE STRENGTH (kpsi) | 8.0 | 8.0 | 8.1 | 8.1 | 8.1 | 7.9 |
| TENSILE ELONGATION (%) | 98 | 80 | 16 | 56 | 72 | 86 |
| SHRINK (in/in × $10^{-3}$) | 8.0 | 7.9 | 9.5 | 9.8 | 7.7 | 7.9 |
| FLEXURAL MODULUS | — | — | 318 | 325 | 322 | 337 |
| FLEXURAL STRENGTH (kpsi) | — | — | 12.7 | 12.8 | 13.1 | 13.7 |
| DELAMINATION | None | None | None | None | None | None |
| T.Y. ORIGINAL (NO AGEING) | 8.9 | 9.1 | 8.3 | 8.7 | 9.2 | 9.1 |

*Comparative Examples

EXAMPLES 8–12

The solubility of PPE-Polyamide blends in formic acid and toluene was evaluated. Table 4 demonstrates that compositions of the present invention exhibit considerably more reaction of PPE with Nylon 6,6 when PPE-TAAC is used as a compatibilizer than when maleic anhydride is used as a compatibilizer as evidenced by the decreasing solubility of the formic acid insoluble fraction of the blends in toluene.

TABLE 4

Solubility of PPE/Polyamide Blends

| SAMPLE | F* | G* | H* | I* | J* | 8 | 9 | 10 | 11 | 12 |
|---|---|---|---|---|---|---|---|---|---|---|
| PPE | 50 | 50 | 50 | 50 | 50 | 47.5 | 45 | 40 | 25 | — |
| PPE-TAAC | — | — | — | — | — | 2.5 | 5 | 10 | 25 | 50 |
| Maleic Anhydride | — | .25 | .5 | 1.0 | 2.0 | — | — | — | — | — |
| NYLON 6,6 | 50 | 50 | 50 | 50 | 50 | 50 | 50 | 50 | 50 | 50 |
| % Soluble in 90% Formic Acid (25 C) | 50.5 | 50.3 | 50.4 | 48.4 | 50.4 | 50.3 | 50.7 | 50.6 | 49.1 | 48.6 |
| % Soluble in Toluene (of formic acid insoluble material 25 C) | 93.1 | 83.8 | 83.7 | 87.2 | 88.3 | 88.1 | 81.5 | 77.8 | 59.7 | 25.3 |

*Comparative Examples

EXAMPLES 13–17

Table 5 demonstrates the effect of various levels of compatibilizers in PPE-Polyamide blends. Compatible PPE-Polyamide blends of the present invention can be provided with a range of suitable properties as required for varied applications.

TABLE 5

Effect of Various Levels of Compatibilizers

| Sample | K* | L* | M* | N* | O* | 13 | 14 | 15 | 16 | 17 | P* | Q* | R* |
|---|---|---|---|---|---|---|---|---|---|---|---|---|---|
| PPE | 50 | 50 | 50 | 50 | 50 | 47.5 | 45 | 40 | 25 | — | 100 | — | — |
| PPE-TAAC | — | — | — | — | — | 2.5 | 7 | 10 | 25 | 50 | — | — | — |
| NYLON 6,6** | 50 | 50 | 50 | 50 | 50 | 50 | 50 | 50 | 50 | 50 | — | 100 | 100 |
| MALEIC ANHYDRIDE | — | .25 | .50 | 1.0 | 2.0 | — | — | — | — | — | — | — | — |
| HDT ('F) @ 264 psi | 416 | 382 | 386 | 381 | 384 | 377 | 392 | 387 | 373 | 376 | 384 | 388 | 394 |

TABLE 5-continued

| Sample | Effect of Various Levels of Compatibilizers | | | | | | | | | | | | |
|---|---|---|---|---|---|---|---|---|---|---|---|---|---|
| | K* | L* | M* | N* | O* | 13 | 14 | 15 | 16 | 17 | P* | Q* | R* |
| IZOD (ft. lb/in) | .16 | .24 | .16 | .24 | .44 | .12 | .16 | .12 | .32 | .40 | .80 | .36 | 1.04 |
| DYNATUP (in. lb) | 5 | 16 | 35 | 33 | 20 | 7 | 9 | 10 | 15 | 24 | 21 | 17 | 314 |
| TENSILE YIELD (kpsi) | 10.1 | 11.3 | 10.8 | 11.4 | 11.5 | 10.7 | 11.4 | 11.5 | 11.3 | 11.3 | 11.8 | 12.5 | 12.6 |
| TENSILE STRENGTH (kpsi) | 9.2 | 6.9 | 7.4 | 6.9 | 7.3 | 10.6 | 11.3 | 7.0 | 6.7 | 6.9 | 9.8 | 4.8 | 8.4 |
| TENSILE ELONGATION (%) | 11 | 52 | 142 | 105 | 73 | 17 | 19 | 49 | 66 | 73 | 76 | 63 | 200 |
| SHRINK (in/in × $10^{-3}$) | 9.2 | 8.1 | 8.2 | 7.5 | 7.6 | 8.5 | 7.6 | 6.6 | 6.4 | 6.5 | 5.3 | 19.8 | 18.4 |
| T.Y. ORIGINAL (NO AGEING) 0% STRAIN | 10.1 | 11.3 | 10.8 | 11.4 | 11.5 | 10.7 | 11.4 | 11.5 | 11.3 | 11.3 | 11.8 | 12.5 | 12.6 |
| % ORIGINAL T.Y. ½% STRAIN | 93 | 99 | 105 | 100 | 99 | 107 | 97 | 99 | 101 | 97 | 76 | 94 | 94 |
| % ORIGINAL T.Y. 1% STRAIN | 96 | 101 | 107 | 100 | 100 | 107 | 86 | 99 | 102 | 103 | 0 | 95 | 95 |
| % ORIGINAL T.Y. 2% STRAIN | 105 | 100 | 107 | 101 | 101 | 106 | 100 | 99 | 102 | 102 | 0 | 94 | 96 |
| % ORIGINAL T.Y. | 80 | 81 | 105 | 99 | 98 | 105 | 77 | 98 | 100 | 99 | 0 | 94 | 94 |

*Comparative Examples
**Nylon 6.6 in example Q has been extruded once following the same extrusion condition used for preparation of PPE/Nylon 6.6 blends before molding. Nylon 6.6 in example R is the virgin resin.

EXAMPLES 18-25

The following examples demonstrate the utility of providing compatible blends of polyphenylene ether and a variety of polaymdes including polyamide 6/6, polamide 6, polyamide 12, and polyamide 4/6. In these examples, the PPE is poly(2,6-dimethyl-1,4-phenylene)ether resin having an intrinsic viscosity of, approximately, 0.45 dl/g as measured in chloroform at 25° C. The SEBS rubber is Shell Kraton G 1651 styrene-ethylene-butylene-styrene copolymer. The sources of polyamide are noted in the tables. All parts are by weight.

TABLE 6

| | Polyphenylene Ether-Polyamide 6/6 Blends | | | |
|---|---|---|---|---|
| | 5* | 18 | T* | 19 |
| Composition | | | | |
| PPE | 50 | 25 | 45 | 22.5 |
| Polyamide 6/6** | 50 | 50 | 45 | 45 |
| PPE-TAAC | — | 25 | — | 22.5 |
| SEBS Rubber | — | — | 10 | 10 |
| Properties | | | | |
| Unnotched Izod (ft-lbs./in) | 3.6 | 9.1 | 19.9 | no break |
| Notched Izod | 0.2 | 0.4 | 0.6 | 3.1 |
| Tensile Yield at Break (KPSI) | 8.6 | 9.8 | 8.2 | 7.8 |
| Elongation (%) | 2.3 | 3.2 | 5.4 | 30.2 |
| HDT (°F., 66 PSI) | >400 | >400 | 390 | 387 |

*Comparison
**DuPont Zytel 101 Polyamide 6/6

TABLE 7

| | Polyphenylene Ether-Polyamide 6/6 Blends | | | |
|---|---|---|---|---|
| | U* | 20 | V* | 21 |
| Composition | | | | |
| PPE | 50 | 25 | 45 | 22.5 |
| Polyamide** | 50 | 50 | 45 | 45 |
| PPE-TAAC | — | 25 | — | 22.5 |
| SEBS Rubber | — | — | 10 | 10 |
| Properties | | | | |
| Unnotched Izod (ft-lbs./in) | 4.2 | 5.1 | 9.3 | no break |
| Notched Izod | — | — | 0.3 | 2.7 |
| Tensile Yield at Break (KPSI) | 8.5 | 8.4 | 7.9 | 7.1 |
| Elongation (%) | 3.1 | 3.0 | 4.3 | 19.8 |
| HDT (°F., 66 PSI) (±5° F.) | 371 | 356 | 363 | 354 |

*Comparison
**NYCOA 471 Polyamide 6, Nylon Company of America

TABLE 8

| | Polyphenylene Ether-Polyamide 12 Blends | | | |
|---|---|---|---|---|
| | W* | 22 | X* | 23 |
| Composition | | | | |
| PPE | 50 | 25 | 45 | 22.5 |
| Polyamide** | 50 | 50 | 45 | 45 |
| PPE-TAAC | — | 25 | — | 22.5 |
| SEBS Rubber | — | — | 10 | 10 |
| Properties | | | | |
| Unnotched Izod (ft-lbs./in) | 4.6 | 11.3 | 3.9 | no break |
| Notched Izod | 0.3 | 0.8 | 0.3 | 3.1 |
| Tensile Yield at Break (KPSI) | 6.7 | 7.0 | 6.3 | 5.6 |
| Elongation (%) | 3.0 | 10.4 | 4.1 | 23.3 |
| HDT (°F., 66 PSI) (±5° F.) | 319 | 303 | 325 | 297 |

*Comparison
**Huels L1901 Polyamide 12

TABLE 9

| | Polyphenylene Ether-Polyamide 4/6 Blends | | | |
|---|---|---|---|---|
| | Y* | 24 | Z* | 25 |
| Composition | | | | |
| PPE | 50 | 25 | 45 | 22.5 |
| Polyamide** | 50 | 50 | 45 | 45 |
| PPE-TAAC | — | 25 | — | 22.5 |
| SEBS Rubber | — | — | 10 | 10 |
| Properties | | | | |
| Unnotched Izod (ft-lbs./in) | 6.6 | 34.3 | 4.7 | no break |
| Notched Izod | 0.5 | 0.7 | 0.6 | 4.2 |
| Tensile Yield at Break (KPSI) | 9.4 | 10.8 | 8.1 | 8.9 |
| Elongation (%) | 3.4 | 10.9 | 3.7 | 31.6 |
| HDT (°F., 66 PSI) (±5° F.) | 414 | 406 | 402 | 399 |

*Comparison
**DSM Polyamide 4/6

We claim:

1. A functionalized-polyphenylene ether compound comprised of the reaction product of a polyphenylene ether polymer and a compound having the general formula (i)-Z-(ii) that contains both group (i) which is at least one polyphenylene ether-philic acylfunctionalized moiety; and group (ii) which is at least one polyamide-philic moiety; and wherein Z is a divalent hydrocarbon radical linking groups (i) and (ii), provided that groups (i) and (ii) are not both the simultaneously carboxylic acid groups.

2. A composition as in claim 1 wherein said polyphenylene ether polymer is selected from the groups consisting of poly(2,6-dimethyl-1,4-phenylene) ether and copolymers of (2,6-dimethyl-1,4-phenylene) and (2,3,6-trimethyl-1,4-phenylene) ethers.

3. A composition as in claim 1 wherein the compound of the formula (i)-Z-(ii) contains a group (i) moiety of the formula

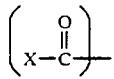

where X is F, Cl, Br, I, OH, OR, or

wherein R is H, an alkyl radical or an aryl radical.

4. A composition as in claim 1 having a compound of the formula (i)-Z-(ii) wherein group (ii) is at least one moiety selected from the group consisting of carboxylic acid, acid anhydride, acid amide, imido, carboxylic acid ester, amino or hydroxyl groups.

* * * * *